July 24, 1934.   G. REINHARDT   1,967,903
ELECTRIC VALVE CONVERTING SYSTEM
Filed Dec. 3, 1932
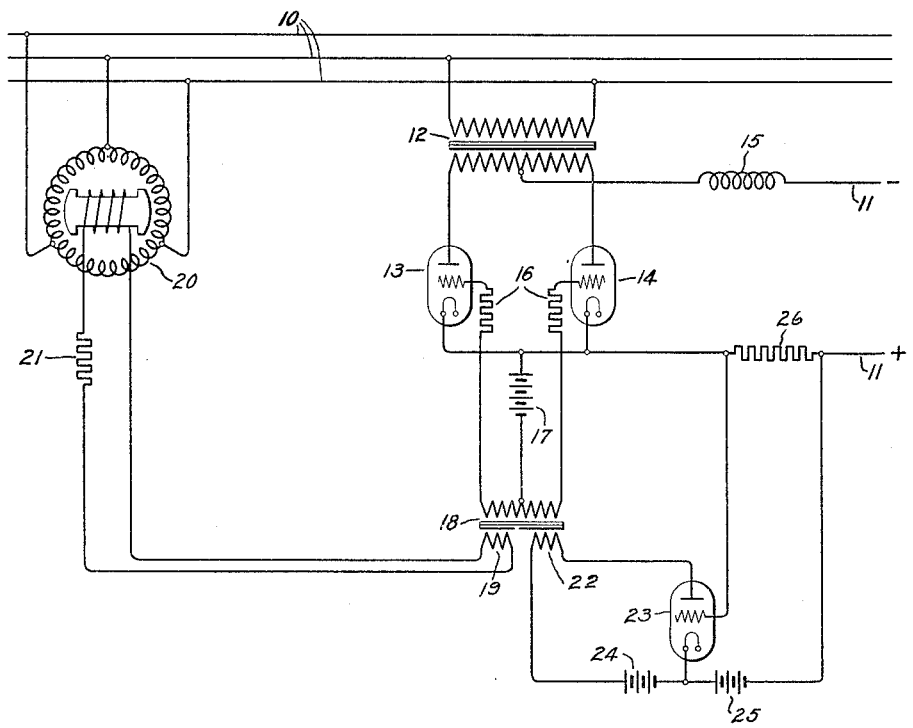
Inventor:
Gustav Reinhardt,
by Charles E. Mullan
His Attorney.

Patented July 24, 1934

1,967,903

UNITED STATES PATENT OFFICE 1,967,903

ELECTRIC VALVE CONVERTING SYSTEM

Gustav Reinhardt, Berlin, Germany, assignor to General Electric Company, a corporation of New York Application December 3, 1932, Serial No. 645,559 In Germany March 17, 1932

6 Claims. (Cl. 175—363)

My invention relates to electric valve converting systems and more particularly to such systems suitable for converting and controlling the energy transmitted between a supply circuit and a load circuit.

Heretofore there have been proposed numerous electric valve converting systems for transmitting energy, and controlling the energy transmitted, between direct and alternating current circuits, direct current circuits of different voltages, or alternating current circuits of the same or different frequencies. In many of these arrangements it is desirable to limit the amount of energy transmitted between the circuits to a predetermined maximum. My invention relates more specifically to an improved electric valve converting system for limiting to a predetermined maximum the energy transmitted between two electric circuits.

It is an object of my invention, therefore, to provide an improved electric valve converting system for transmitting energy between two electric circuits by means of which the energy transmitted between the two circuits may be readily controlled.

It is another object of my invention to provide an improved electric valve converting system for transmitting energy between two electric circuits in which the energy transmitted therebetween may be limited to a predetermined maximum.

It is a still further object of my invention to provide an improved electric valve converting system for transmitting energy between two electric circuits in which the flow of energy between the circuits may be completely interrupted whenever it exceeds a predetermined maximum.

In accordance with my invention, a supply circuit and a load circuit are interconnected through an electric valve converting apparatus including an electric valve provided with a control grid. There is provided a control circuit for the valve grid including a source of negative bias potential tending to maintain the valve non-conductive and a control transformer energized from a source of control potential. The system also includes means responsive to a predetermined electrical condition of the apparatus, such as the current, voltage, etc. for saturating the transformer so that the control transformer is rendered ineffective and the bias potential effective to render the valve non-conductive to disconnect the load circuit.

For a better understanding of my invention, together with other and further objects thereof, reference is had to the following description taken in connection with the accompanying drawing and its scope will be pointed out in the appended claims. The single figure of the drawing illustrates an arrangement embodying my invention for transmitting energy from an alternating current supply circuit to a direct current load circuit.

Referring now more particularly to the drawing, there is illustrated an embodiment of my invention for transmitting energy from an alternating current circuit 10 to a direct current load circuit 11. This arrangement includes a rectifying apparatus comprising a transformer 12, the primary winding of which is connected to the supply circuit 10 and the secondary winding of which is provided with an electrical midpoint connected to one side of the direct current circuit 11 and with end terminals connected to the other side of the direct current circuit 11 through electric valves 13 and 14. A current smoothing reactor 15 is preferably included in the direct current circuit as illustrated. Each of the valves 13 and 14 is provided with an anode, a cathode and a control grid and may be of any of the several types well known in the art, although I prefer to use valves of the vapor electric discharge type.

In order to control the amount of energy transmitted from the supply circuit 10 to the load circuit 11, the grids of the valves 13 and 14 are connected to their common cathode circuit through current limiting resistors 16, a negative bias battery 17 and opposite halves of the secondary winding of a grid transformer 18. The grid transformer 18 is provided with a primary winding 19 which is energized from the supply circuit 10 through any suitable phase shifting arrangement, although I have shown by way of example a rotary phase shifting transformer 20. In certain cases it may be desirable to make the grid transformer 18 self saturating to convert the alternating supply potential into one of peaked wave form for exciting the grids of the valves 13 and 14. A current limiting resistor 21 is preferably included in circuit with the primary winding 19. The grid transformer 18 is also provided with a saturating winding 22 which is connected to be energized from a source of unidirectional current, such as a battery 24, through an electric valve 23, preferably of the vapor electric type. The control grid of the valve 23 is normally biased negatively to maintain the valve non-conductive by means of a negative bias battery 25. The control circuit of the valve 23 also contains a source of potential variable in magnitude in accordance with an electrical condition of the converting apparatus which it is desired to control; for example, the voltage or current of the supply circuit 10 or load circuit 11. By way of example, I have illustrated an arrangement responsive to the magnitude of the current in the direct current 11. This arrangement comprises a resistor 26 connected in series with the direct current circuit 11 and included also in the control circuit of the electric valve 23, and so connected that its terminal potential is in opposition to that of the negative bias battery 25.

The general principles of operation of the above described rectifying apparatus will be well understood by those skilled in the art. The valves 13 and 14 supply alternate half cycles of the supply current to the direct current circuit 11. By properly adjusting the rotary phase shifting transformer 20, the point in the cycle of positive anode potential at which each valve becomes conductive is thereby controlled to control the average voltage impressed upon the direct current circuit 11. In case the current supplied to the circuit 11 exceeds a predetermined value the potential drop across the resistor 26 will exceed that of the battery 25 so that the resultant grid potential of the valve 23 becomes positive to render this valve conductive. When the valve 23 becomes conductive the saturating winding 22 of the grid transformer 18 is energized from the battery 24 and the transformer 18 becomes completely saturated so that no potential is induced in the secondary winding by the primary winding 19. The result is that the negative bias battery 17 maintains the grids of the valves 13 and 14 both at a high negative potential, these valves become non-conductive and the direct current circuit 11 is effectively disconnected from the supply circuit 10.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a supply circuit, a load circuit, converting apparatus interconnecting said circuits and including an electric valve provided with a control grid, a control circuit for said grid inculding a source of negative bias potential and a control transformer, a source of control potential for energizing said transformer, and means responsive to a predetermined electrical condition of said apparatus for saturating said transformer to modify the effect of said control circuit.

2. In combination, an alternating current supply circuit, a load circuit, converting apparatus interconnecting said circuits and including a vapor electric valve provided with a control grid, a control circuit for said grid including a source of negative bias potential and a control transformer, means for energizing said transformer from said supply circuit to control normally the energy transmitted by said apparatus, and means responsive to a predetermined electrical condition of said apparatus for saturating said transformer whereby said bias potential renders said valve non-conductive to disconnect said load circuit.

3. In combination, an alternating current supply circuit, a load circuit, rectifying apparatus interconnecting said circuits and including a pair of vapor electric valves each provided with a control grid, a control circuit for said grids including a source of negative bias potential and a source of alternating potential derived from said supply circuit and variable in phase with respect thereto, a self-saturating transformer including said control circuit for converting the potential derived from said supply circuit into one of peaked wave form, and means responsive to a predetermined electrical condition of said apparatus for saturating said transformer whereby said bias potential renders said valves non-conductive to disconnect said load circuit.

4. In combination, a supply circuit, a load circuit, converting apparatus interconnecting said circuits and including an electric valve provided with a control grid, a control circuit for said grid including a source of negative bias potential and a control transformer, a source of control potential for energizing said transformer, a saturating winding for said transformer, an energizing circuit for said saturating winding including a normally non-conductive electric valve, and means responsive to a predetermined electrical condition of said apparatus for rendering said second mentioned electric valve conductive, whereby said bias potential renders said first mentioned valve non-conductive to disconnect said load circuit.

5. In combination, a supply circuit, a load circuit, converting apparatus interconnecting said circuits and including an electric valve provided with a control grid, a control circuit for said grid including a source of negative bias potential and a control transformer, a source of control potential for energizing said transformer, and means responsive to predetermined current drawn from said supply circuit for saturating said transformer whereby said bias potential renders said valve non-conductive to disconnect said load circuit.

6. In combination, a supply circuit, a load circuit, converting apparatus interconnecting said circuits and including an electric valve provided with a control grid, a control circuit for said grid including a source of negative bias potential and a control transformer, a source of control potential for energizing said transformer, a saturating winding for said transformer, an energizing circuit for said saturating winding including a second electric valve provided with a control grid, and a control circuit for said second valve including a source of negative bias potential and an impedence subject to the load current of said apparatus and connected so that its terminal potential opposes the negative bias potential of said second valve.

GUSTAV REINHARDT.

CERTIFICATE OF CORRECTION.

Patent No. 1,967,903.   July 24, 1934.

GUSTAV REINHARDT.

It is hereby certified that error appears in the printed specification of the above numbered patent requiring correction as follows: Page 2, line 93-94, claim 3, for "including" read included in; and that the said Letters Patent should be read with this correction therein that the same may conform to the record of the case in the Patent Office.

Signed and sealed this 11th day of September, A. D. 1934.

Leslie Frazer
Acting Commissioner of Patents.

(Seal)